US012687061B2

(12) United States Patent
Prentner et al.

(10) Patent No.: US 12,687,061 B2
(45) Date of Patent: Jul. 21, 2026

(54) HYDRAULIC DAMPER FOR FURNITURE DOORS AND DRAWERS

(71) Applicant: SAMET KALIP VE MADENI ESYA SAN VE TIC. A.S, Esenyurt/Istanbul (TR)

(72) Inventors: Christian Prentner, Götzis (AT); Nurettin Güzeltepe, Esenyurt/Istanbul (TR); Umut Coskun, Esenyurt/Istanbul (TR)

(73) Assignee: SAMET KALIP VE MADENI ESYA SAN VE TIC. A.S, Esenyurt/Istanbul (TR)

( * ) Notice: Subject to any disclaimer, the term of this patent is extended or adjusted under 35 U.S.C. 154(b) by 86 days.

(21) Appl. No.: 18/842,293

(22) PCT Filed: Dec. 1, 2021

(86) PCT No.: PCT/TR2021/051320
§ 371 (c)(1),
(2) Date: Aug. 28, 2024

(87) PCT Pub. No.: WO2023/101622
PCT Pub. Date: Jun. 8, 2023

(65) Prior Publication Data

US 2025/0179854 A1 Jun. 5, 2025

(51) Int. Cl.
*E05F 5/02* (2006.01)
*A47B 88/477* (2017.01)
(Continued)

(52) U.S. Cl.
CPC .............. *E05F 5/10* (2013.01); *A47B 88/477* (2017.01); *E05F 5/08* (2013.01); *E05Y 2900/20* (2013.01)

(58) Field of Classification Search
CPC ..... E05F 3/00; E05F 3/10; E05F 3/108; E05F 3/14; E05F 3/16; E05F 3/18; E05F 3/20;
(Continued)

(56) References Cited

U.S. PATENT DOCUMENTS

| | | | | |
|---|---|---|---|---|
| 4,240,619 A * | 12/1980 | Wirges | F16F 9/0227 | 267/129 |
| 4,595,182 A * | 6/1986 | Freitag | F16F 9/0227 | 267/64.12 |

(Continued)

FOREIGN PATENT DOCUMENTS

| | | | |
|---|---|---|---|
| CN | 105650188 A * | 6/2016 | F16F 9/3214 |
| CN | 206904138 U * | 1/2018 | |

(Continued)

*Primary Examiner* — Chuck Y Mah
(74) *Attorney, Agent, or Firm* — Nath, Goldberg & Meyer; Joshua B. Goldberg

(57) ABSTRACT

Hydraulic damper(1000) for furniture doors or drawers. Damper(1000) comprises housing(1) having a closed first end(14) and a second end provided with lid(7); and piston(2) movable in housing(1) along longitudinal piston axis(A). Piston(2) defines first and second chambers(11,12) inside housing(1), respectively at first and second end-sides of piston(2). Piston(2) comprises circumferential groove(24) defined between circumferential first and second shoulders (241,242). Groove(24) is provided with annular collar(5) axially movable between first and second shoulders(241, 242). Collar(5) is formed from elastic material to reversibly contact inner surface(13) of housing(1) when radially expanded when subjected to hydraulic-pressure forces parallel to axis(A). First shoulder(241) is arranged allowing hydraulic fluid to flow on collar(5) when collar(5) contacts first shoulder(241). Second shoulder(242) is arranged blocking hydraulic fluid from flowing on collar(5) when collar(5) contacts second shoulder(242). Piston(2) is provided with
(Continued)

channel(21) arranged to provide fluid flow communication between first and second chambers(11,12).

13 Claims, 10 Drawing Sheets

(51) Int. Cl.
*E05F 5/08* (2006.01)
*E05F 5/10* (2006.01)

(58) Field of Classification Search
CPC ... E05F 3/102; E05F 5/00; E05F 5/003; E05F 5/02; E05F 5/06; E05F 5/006; E05F 5/08; E05F 5/10; E05F 5/022; E05Y 2900/54; E05Y 2900/548; E05Y 2201/21; E05Y 2201/254; E05Y 2201/256; E05Y 2201/264; E05Y 2201/266; E05Y 2201/412; E05Y 2600/456; E05Y 2900/20; A47B 88/477; A47B 88/473; A47B 2210/0091; A47B 2210/0044; A47B 2210/0097
USPC ............................... 16/82, 84, 85, 86 B, 286
See application file for complete search history.

(56) References Cited

U.S. PATENT DOCUMENTS

2008/0295283 A1* 12/2008 Tice .......................... E05F 5/10 16/84
2009/0094789 A1* 4/2009 Bereznai ................... E05F 5/10 16/84
2010/0162521 A1* 7/2010 Pyo ......................... F16F 9/512 16/51
2010/0287729 A1* 11/2010 Jin ............................ E05F 3/12 16/72
2011/0253493 A1* 10/2011 Svara .................... F16F 9/3228 188/313
2015/0226284 A1* 8/2015 Dora ......................... E05F 5/02 188/280
2017/0016260 A1* 1/2017 Pyo ........................... F16F 9/19
2017/0254133 A1* 9/2017 Liang ...................... F16F 9/346
2018/0259026 A1* 9/2018 Shimozaki .............. F16F 9/368
2018/0266512 A1* 9/2018 Zimmer .................... E05F 5/02
2019/0133320 A1* 5/2019 Chen ..................... F16F 9/5126
2020/0347837 A1* 11/2020 Zimmer .................. F16F 9/346
2021/0148148 A1* 5/2021 Weber ....................... E05F 3/12

FOREIGN PATENT DOCUMENTS

JP 2009133460 A * 6/2009 ................ E05F 5/10
TW 201504541 A * 2/2015

* cited by examiner

HYDRAULIC DAMPER FOR FURNITURE DOORS AND DRAWERS

This is a National Phase Application filed under 35 U.S.C. 371 as a national stage of PCT/TR2021/051320, filed Dec. 1, 2021, the content of which is hereby incorporated by reference in its entirety.

TECHNICAL FIELD

The present invention relates to hydraulic dampers. In particular, the present invention relates to hydraulic dampers for use in damping furniture doors and drawers.

BACKGROUND

Hydraulic dampers can be used for prevention of impacts at closing of movable furniture parts such as furniture doors and drawers. In case where a user performs repetitive closing re-opening actions on such movable furniture part within a short time interval, respective dampers may not be able to show a consistent damping performance. Furthermore, such repetitions usually cause deformations on inner components of dampers, especially when repeated with short time intervals. This fact results in decreased damper service life.

Accordingly, it is needed to develop a furniture damper with optimal response and enhanced service life.

SUMMARY

A primary object of the present invention is to overcome the above-mentioned shortcomings of the prior art. Another object of the present invention is to provide a hydraulic furniture damper with an optimized response in returning its normal state upon a closing action. A further object of the present invention is to provide a hydraulic furniture damper with high mechanical stability and with an increased service life. The present invention achieves said objects with the combination of features proposed in the appended claims.

The present invention proposes a hydraulic damper for use in furniture doors or drawers. The damper comprises a housing that has a closed first end and a second end that is provided with a lid; and further comprises a piston that is movable in the housing along a longitudinal piston axis. The housing is divided by the piston to define a first chamber and a second chamber that are respectively at a first end side and a second end side of the piston. The piston comprises a circumferential groove that is defined between a circumferential first shoulder and a circumferential second shoulder provided at a second end side with regard to the first shoulder. The groove is provided with an annular collar that is axially movable between the first shoulder and second shoulder. The collar is formed from an elastic material, and is arranged to reversibly contact to an inner surface of the housing when radially expanded when subjected to hydraulic pressure forces that are parallel to the axis. The first shoulder is arranged to allow hydraulic fluid to flow on the collar when the collar is brought into contact with the first shoulder. The second shoulder is arranged to block hydraulic fluid from flowing on the collar when the collar is brought into contact with the second shoulder. The piston is provided with a channel that is arranged to provide fluid flow communication between said first chamber and second chamber. This combination of features provides a hydraulic damper which rapidly recovers its original/default state upon being subjected to a closing action. Thus, such damper can give a consistent damping response (or performance) at multiple closing actions that are repeated with short time intervals between each other.

Preferably, the channel is arranged to provide a fluid flow communication between the second chamber and the groove. Preferably, in such damper, the groove is provided with a hole connected to the channel. Preferably, in such damper, the collar is shaped and sized to, delimit the fluid communication through the hole when in contact with the first shoulder and relatively increase the fluid flow communication through the hole when in contact with the second shoulder.

Preferably, in any of the damper embodiments summarized above, the first shoulder can comprise a plurality of radial indentations to provide a local diameter value smaller than a corresponding local inner diameter of the collar.

Any of the damper embodiments summarized above can preferably be provided with a seal circumferentially disposed around the rod, arranged for preventing hydraulic liquid leakage from the second chamber towards the lid. Preferably, such damper is provided with a first elastic means in-between the lid and the seal, for biasing the seal away from the lid. Preferably, the housing is provided with an extended diameter around a locus of the seal to have a value that is higher than an inner diameter of the housing at the first chamber and second chamber.

Any of these damper embodiments can preferably be provided with a supporting means in-between the seal and first elastic means, arranged for bearing the first elastic means and for uniformly distributing the mechanical forces from the first elastic means onto the seal.

Any of the damper embodiments summarized above can preferably be provided with a second elastic means disposed between the first end and the piston, arranged for biasing the piston away from the first end.

Considering that any of the damper embodiments summarized above may have the inherent properties of that: the collar comprises a circumferential outer surface facing the inner surface of the housing, the outer surface having a cylinder side surface geometry with a height; at zones that correspond to a trajectory of the piston at its reciprocations along the axis, the inner surface of the housing has an inner diameter radial to said axis; and a ratio between said height and said inner diameter is preferably 0.3 or higher, more preferably 0.4 or higher. This feature enhances the stability and service life of the damper.

The present invention further proposes a furniture hinge or furniture drawer that is provided with any of the damper embodiments that are summarized above.

BRIEF DESCRIPTION OF FIGURES

The figures, a brief explanation of which is herewith provided, are solely intended for providing a better understanding of the present invention and are as such not intended to define the scope of protection or the context in which said scope is to be interpreted in the absence of the description.

DETAILED DESCRIPTION

Figure 1:
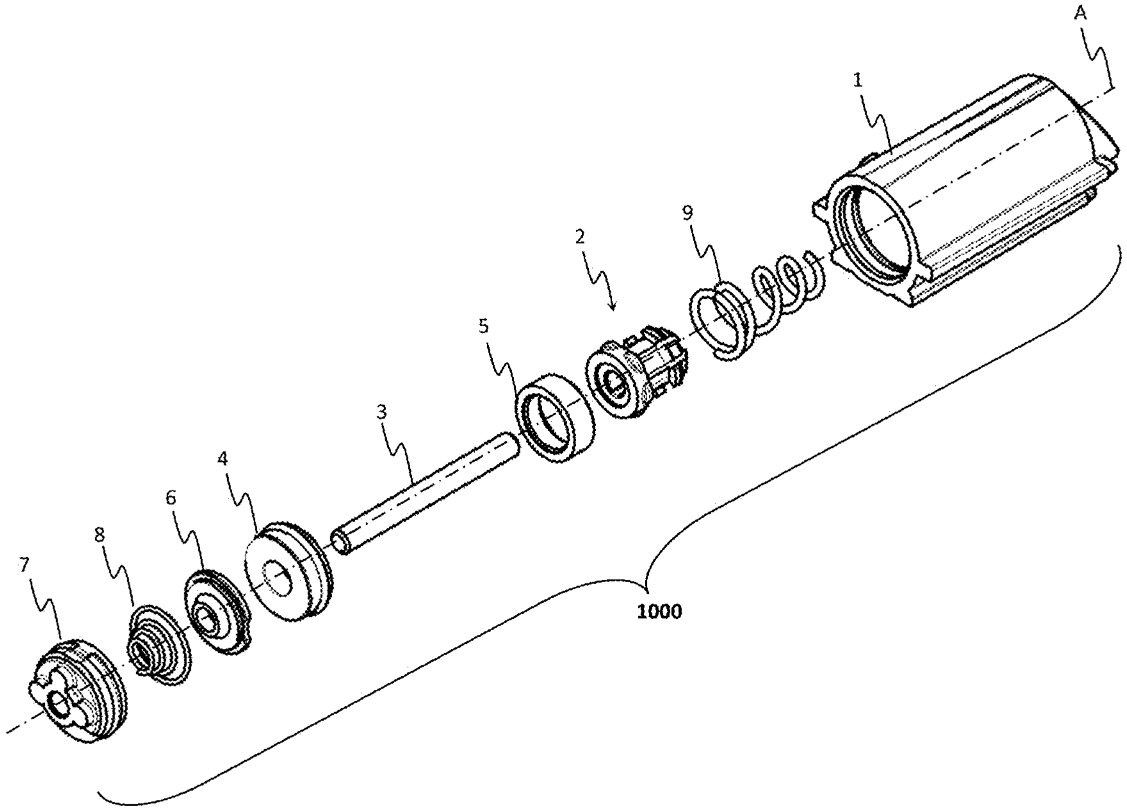
FIG. 1 shows an exploded view of an exemplary embodiment of the damper according to the present invention.

Referring to the figures outlined above, the present invention proposes a hydraulic damper (1000) for use in damping furniture doors or drawers. FIG. 1 shows an exploded view of an exemplary embodiment of the damper (1000) according to the present invention.

The damper (1000) includes a housing (1) and a piston (2) that is movable in the housing (1) along a longitudinal piston axis (A). The housing (1) can be considered to include a closed first end (14) and a second end that is provided with a lid (7) circumferentially arranged around a rod (3) that is connected to the piston (2), for allowing reciprocations of the rod (3) and thus, of the piston (2)) along the axis (A).

The piston (2) axially defines a first chamber (11) and a second chamber (12) inside the housing (1), respectively being at a first end side and at a second end side of the piston (2).

The damper (1000) can be provided with a second elastic means (9) (e.g., compression spring) arranged between the first end (14) and the piston (2), The second elastic means (9) can serve for biasing the piston (2) away from the first end (14), until resulting value of forces (e.g., hydraulic fluid pressure forces and any spring forces) applying onto the first end side and second end side of the piston is equal to zero. At an instance in which said resulting value of forces is zero, the piston (2) can be considered to rest at a default position (i.e., resting position) thereof.

The piston (2) comprises a circumferential groove (24) around the axis (A). The groove (24) is defined between a circumferential first shoulder (241) and a circumferential second shoulder (242) that is provided at a second end side with regard to the first shoulder (241). The groove (24) is provided with an annular collar (5) that is axially movable between the first shoulder (241) and second shoulder (242). That the annular collar (5) is axially movable, corresponds to that the annular collar (5) is movable along a central axis (A1) thereof, said central axis (A1) overlapping the longitudinal axis (A) of the rod (3). The collar (5) is formed from an elastic material, and arranged (that is, shaped and sized) to reversibly contact to an inner surface (13) of the housing (1) when radially expanded upon being subjected to hydraulic pressure forces that are parallel to the axis (A); e.g., by having a geometric shape that includes inclined side surfaces (52) arranged to convert hydraulic pressure forces in directions parallel to the axis (A) into radial force components. The collar (5) can be made of e.g., rubber; and can be formed by e.g., mold injection.

The first shoulder (241) is arranged (i.e., shaped and sized) to allow hydraulic fluid to flow on the collar (5), when the collar (5) is brought into contact with the first shoulder (241). On the other hand, the second shoulder (242) is arranged to block hydraulic fluid from flowing on the collar (5), when the collar (5) is brought into contact with the second shoulder (242). That is, the second shoulder (242) is arranged to circumferentially strike with the collar (5) when the collar (5) biases onto the second shoulder (242), such that fluid flow communication around the piston between the first chamber (11) and second chamber (12) is circumferentially ceased.

The piston (2) is provided with a channel (21), arranged for provision of fluid flow communication between said first chamber (11) and second chamber (12). The channel (21) can be considered as arranged for provision of hydraulic fluid to flow between the first chamber (11) and second chamber (12) (although at a relatively high pressure drop) to equalize the fluid pressures in the first chamber (11) and second chamber (12), when the fluid flow around the second shoulder (242) is blocked (i.e., when the collar (4) is biased onto the second shoulder (242), and hermetically seals the fluid flow around the second shoulder (242)). That is, when the piston (2) is pushed towards the first end (14) along the axis (A), respective volumes of said first chamber (11) and second chamber (12) vary to equalize respective hydraulic fluid pressures at both sides of the piston (2), by effecting a transfer of a hydraulic fluid from the first chamber (11) to the second chamber (12) through said channel (21), since the flow around the piston (2) (i.e., around the second shoulder (242)) is blocked due to temporary hermetic sealing by the collar (5).

Figure 2A:
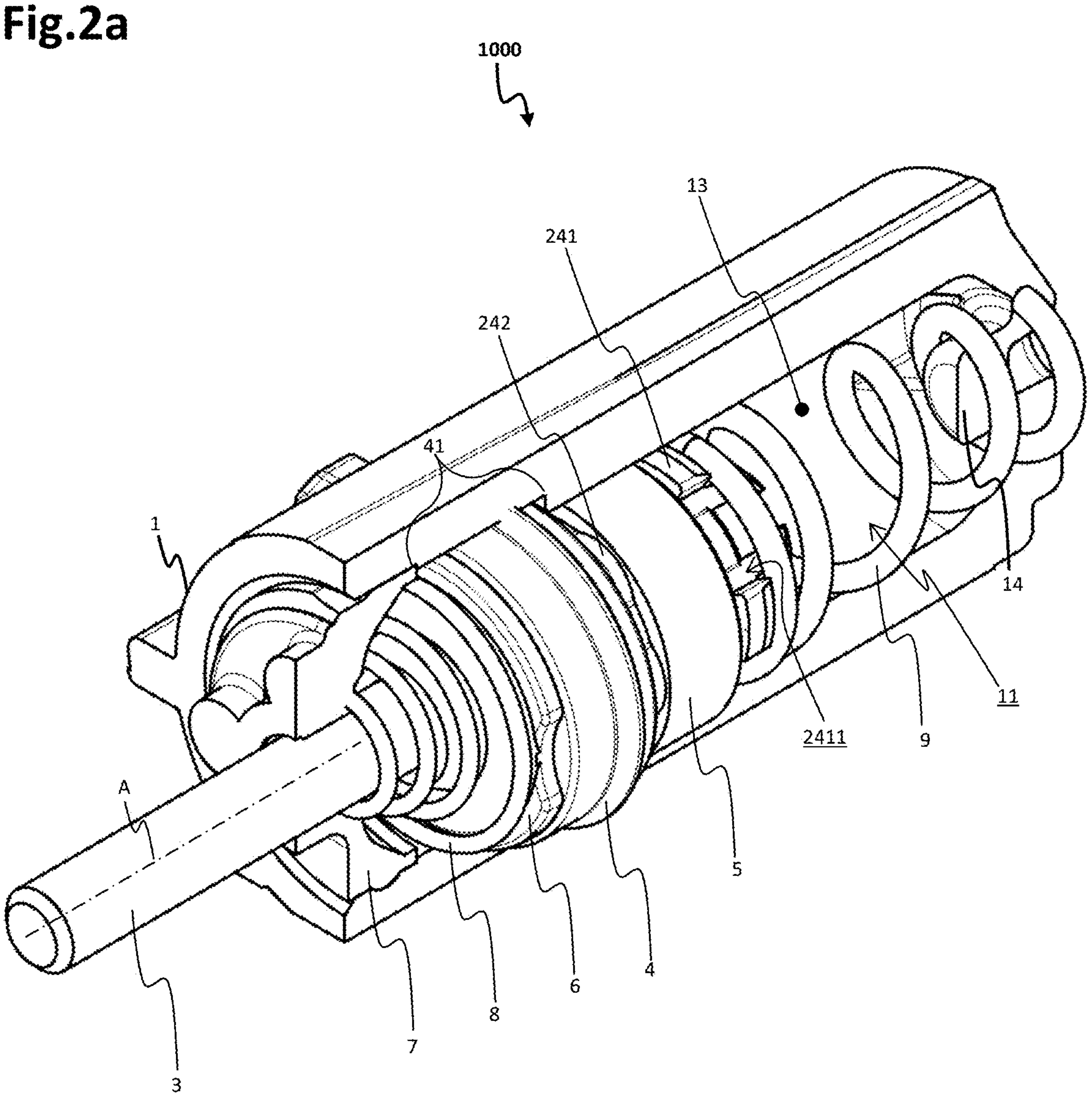
FIG. 2*a* shows a partial cutaway view of the embodiment shown in FIG. 1.
Figure 2B:
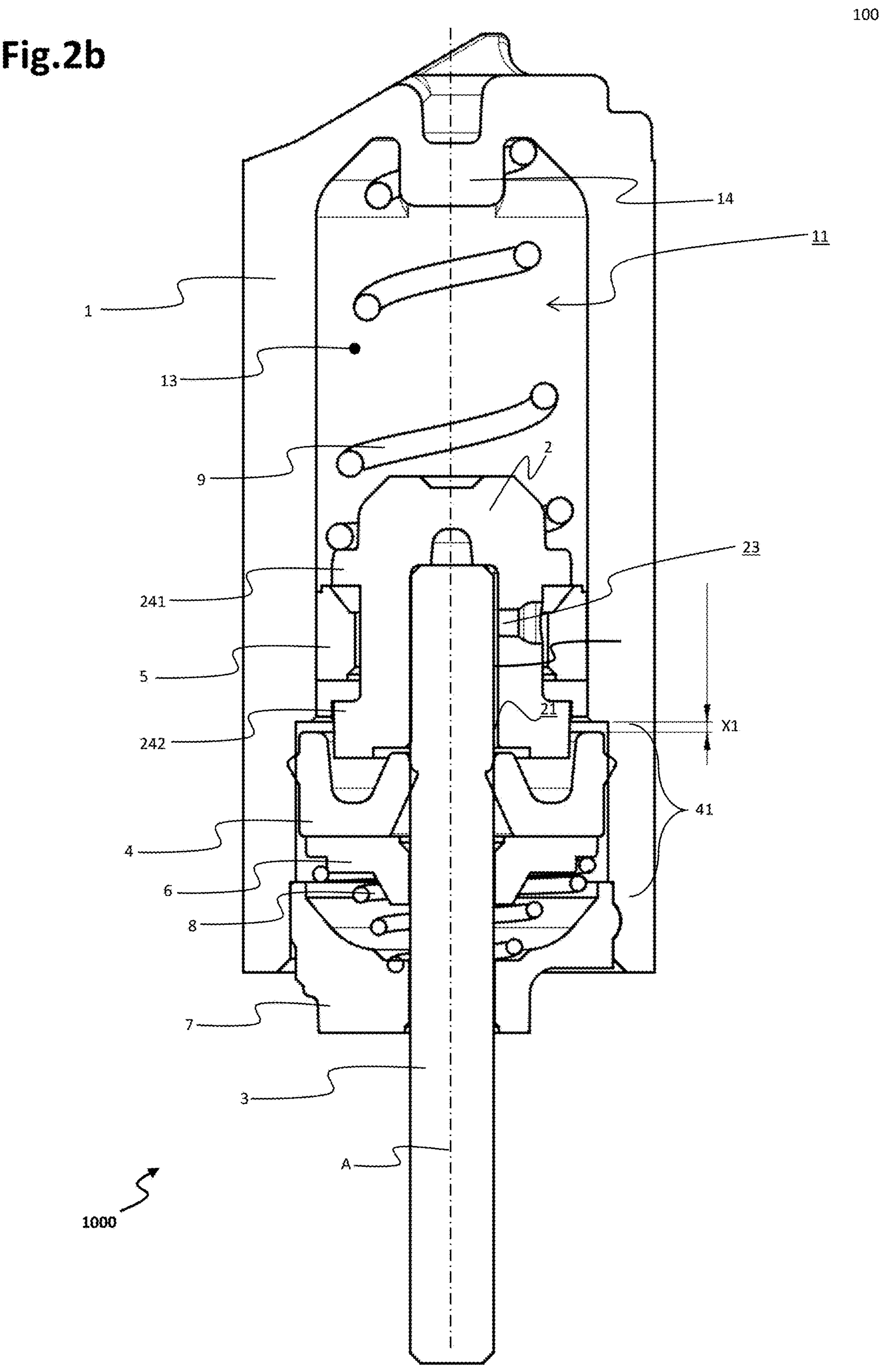
FIG. 2*b* shows an axial section view based on FIG. 2*a*.

FIG. 2*a* shows a partial cutaway view of the embodiment shown in FIG. 1. Here, the hydraulic fluid in the first and second chambers (11, 12) is in pressure balance, and the second elastic means (9) and first elastic means (8) are at their respective expanded states. Thus, the resulting axial forces exerted onto the piston result is zero and the piston is in its resting position. FIG. 2*b* shows an axial section view based on FIG. 2*a*, for a clearer visualisation of the components thereof.

In a preferred embodiment, the channel (21) can be arranged to provide a fluid flow communication between the second chamber (12) and the groove (24). To this end, the groove (24) can be provided with a hole (23) connected to the channel (21), thereby providing fluid flow communication between the channel (21) and first chamber (11). More preferably, the collar (5) is shaped and sized to delimit the fluid communication via the hole (23) when in contact with the first shoulder (241) and relatively increase the fluid flow communication through the hole (23) when in contact with the second shoulder (242).

Figure 3A:
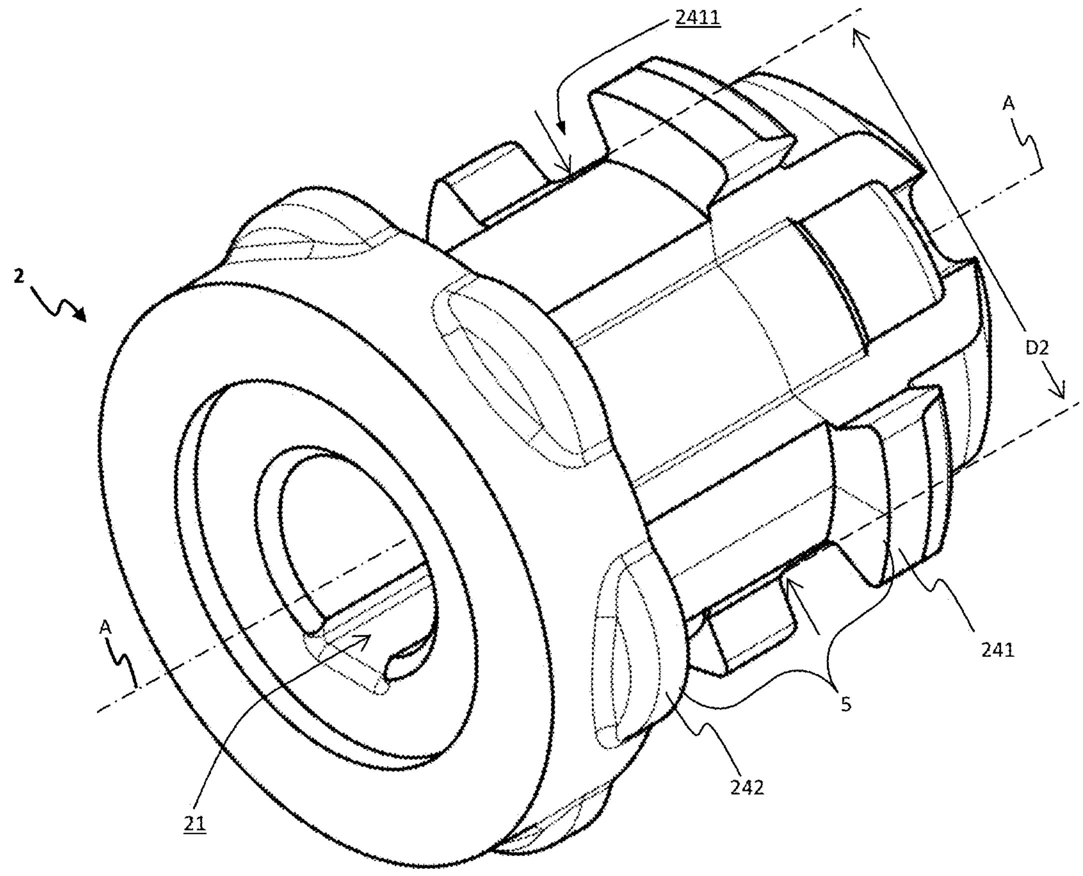
FIG. 3*a* shows perspective view of an exemplary piston for being employed in a damper according to the present invention.
Figure 3B:
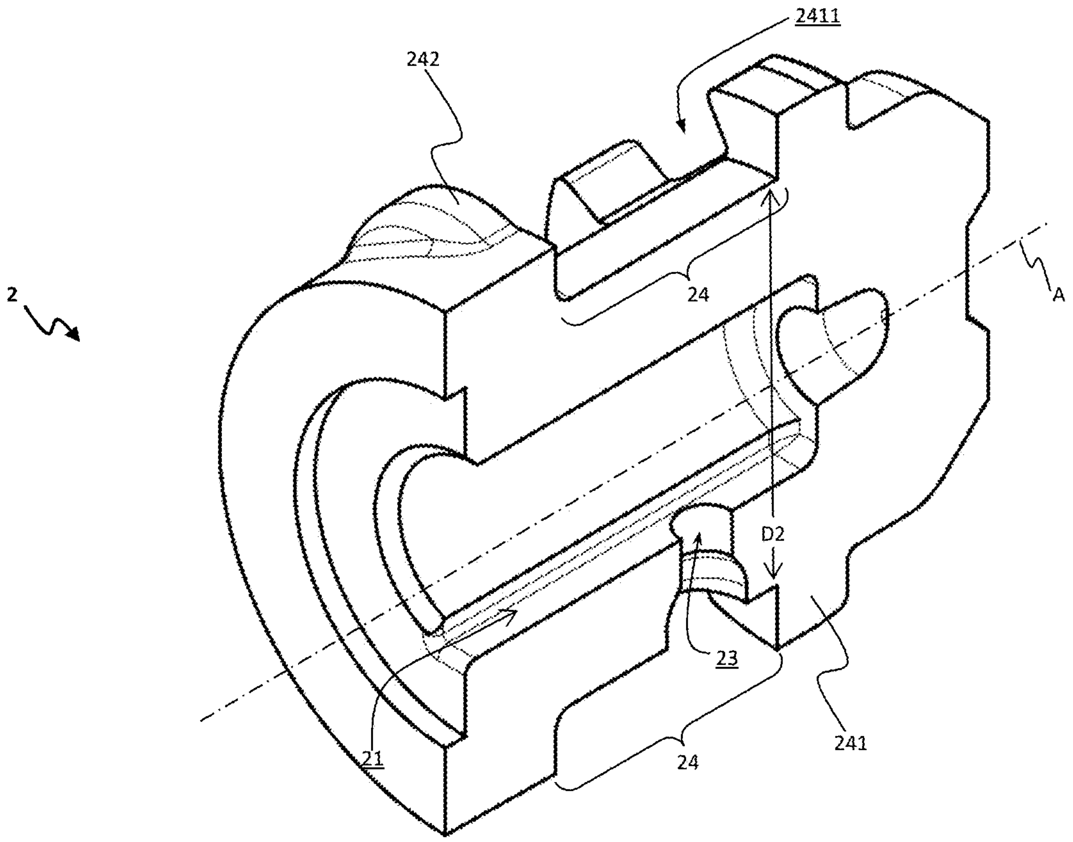
FIG. 3*b* shows a perspective section of the piston that is depicted in FIG. 3*a*.

FIG. 3*a* shows perspective view of an exemplary piston (corresponding to a piston head within the context of the present invention) for being employed in a damper according to the present invention. Here, the first shoulder (241) is provided with indentations (2411) (cutaways) to obtain decreased local diameters for facilitating flow of hydraulic fluid around the piston (2), to balance the high hydraulic pressure in the second chamber (12) by being transferred towards the first chamber (11). FIG. 3*b* shows a perspective section of the piston (2) that is depicted in FIG. 3*a*. Here, the fluid flow communication between the channel (21) and the hole (23) is emphasized.

The damper (1000) can be further provided with a seal (4) circumferentially disposed around the rod (3), for preventing hydraulic liquid leakage from the second chamber (12) towards the lid (7). The damper (1000) can be equipped with a first elastic means (8) (e.g., compression spring) in-between the lid (7) and the seal (4), for biasing the seal (4) away from the lid (7), thus for temporarily allowing the seal (4) to approach towards the lid (7) (that is, towards the second end) at instances where the hydraulic pressure in the second chamber (12) increases. The first elastic means (8) can be considered as a means for returning the seal (4) to a default position thereof. In presence of the first elastic means (8), the seal (4) is provided with an axial positioning flexibility to move in accordance with the hydraulic pressure in the second chamber (12). Thus, the seal (4) functions in compensation/equalization of fluid pressure and volume in the second chamber (12).

The housing (1) is preferably arranged for restraining axial movement of the seal (4) towards the piston (2) within a seal zone (41). This measure can be taken by arranging the housing (1) with an extended diameter (D3) around a locus of the seal (4) (that is, the diameter (D3) of housing (1) at the seal zone (41)) to have a value that is higher than an inner diameter (D1) of the housing (1) at the first chamber (11) and second chamber (12).

The damper (1000) can be further provided with a supporting means (6) in-between the seal (4) and first elastic means (8), arranged for bearing the first elastic means (8) and for uniformly distributing the mechanical forces from the first elastic means (8) onto the seal (4), thereby protecting the seal (4) from being mechanically damaged by the first elastic means (8).

At an action for closing of a furniture door hinge or of a furniture drawer that is provided with the damper (1000), the rod (2) is forced to axially move into the housing (1). When the rod (3) is pushed to move the piston (2) towards the first end (14), the following phenomena take place:

The volume of the first chamber (11) decreases and the pressure of hydraulic fluid from the first chamber (11) forces the collar (5) to radially expand such that outer surface (51) of the collar (5) circumferentially contact the inner surface (13) of the housing (1), thereby causing friction along with hermetical sealing therebetween.

Due to said friction, the collar (5) moves relative to the piston (2) towards the second shoulder (242) to circumferentially bias thereonto, thereby a hermetical sealing takes effect between corresponding striking surfaces of the collar (5) and the second shoulder (242).

Hence, a circumferential hermetic sealing takes place to block fluid flow communication around the piston between the first chamber (11) and second chamber (12). Fluid flow communication between the first chamber (11) and the second chamber (12) is available through the channel (21), to effect transfer of hydraulic fluid from the first chamber (11) into the second chamber (12), but not available around the piston (2). So, the fluid flow communication is restricted to take place only through the channel (21) that provides a relatively small flow cross-section when compared to that around the piston (2). Accordingly, a dampening is availed by the damper (1000).

Figure 4A:
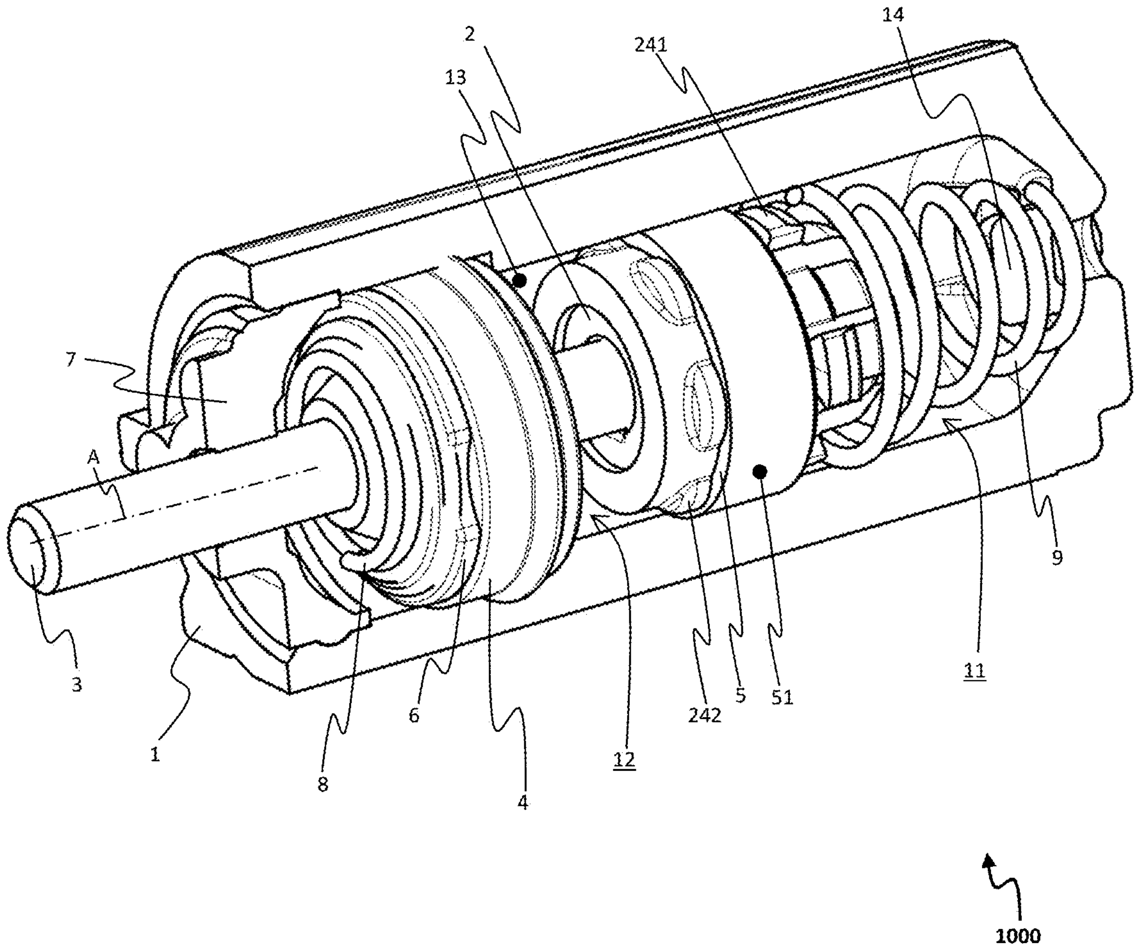
FIG. 4*a* shows a partial cutaway view of the embodiment shown in FIG. 1 at an instance where the rod is pushed into the housing.
Figure 4B:
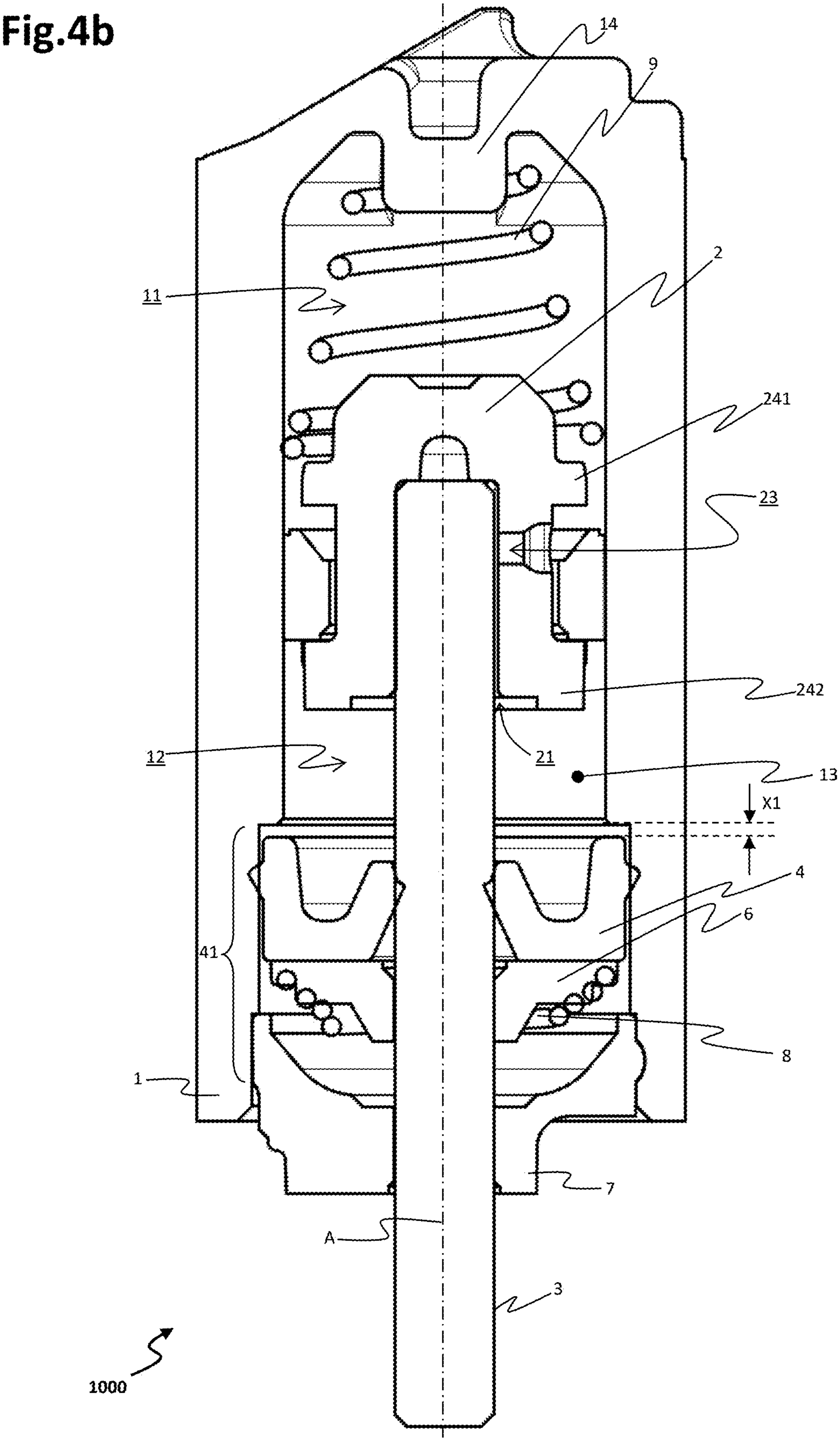
FIG. 4*b* shows an axial section view based on FIG. 4*a*.

FIG. 4*a* shows a partial cutaway view of the embodiment shown in FIG. 1 at an instance where the rod (3) is pushed into the housing. Thus, a forcing of the piston is initialized to move towards the first end (14), to compress the hydraulic fluid in the first chamber (11), and initializes exertion of a hydraulic force onto the collar (5) in an axial direction towards the second chamber (12). The collar (5) undergoes a radial expansion, circumferentially seals the space between the second shoulder (242) and inner surface (13) of the housing (1). The second elastic means (9) is partially compressed, yet the temporarily decreased hydraulic pressure in the second chamber (12) did not yet cause any compression of the first elastic means (8). FIG. 4*b* shows an axial section view based on FIG. 3*a*, for a clearer visualisation of the components thereof at such instance.

Figure 5A:
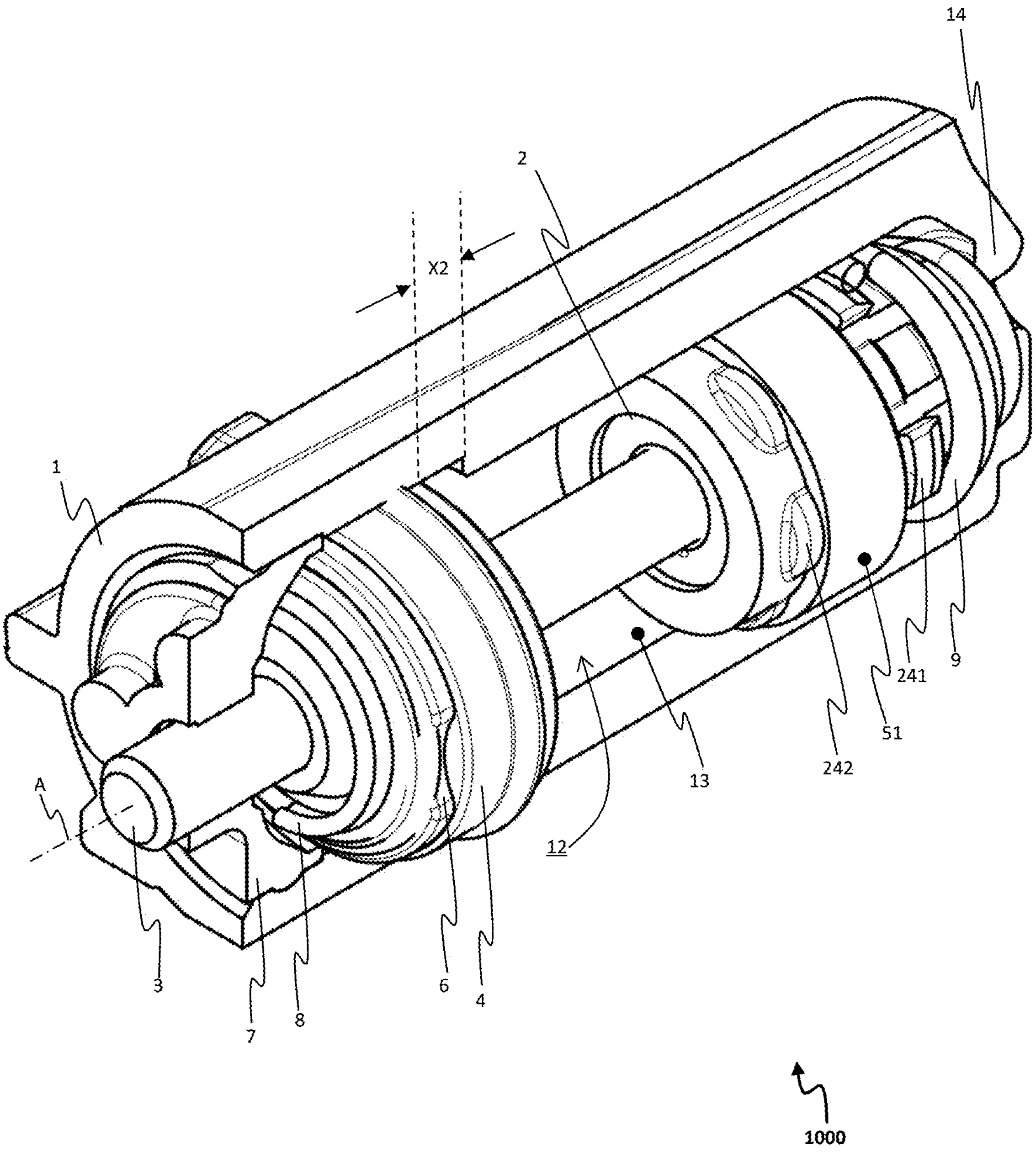
FIG. 5*a* shows a partial cutaway view of the embodiment shown in FIG. 1 at an instance where the rod is pushed into the housing at a greater extent when compared to that shown in FIG. 4*a*.
Figure 5B:
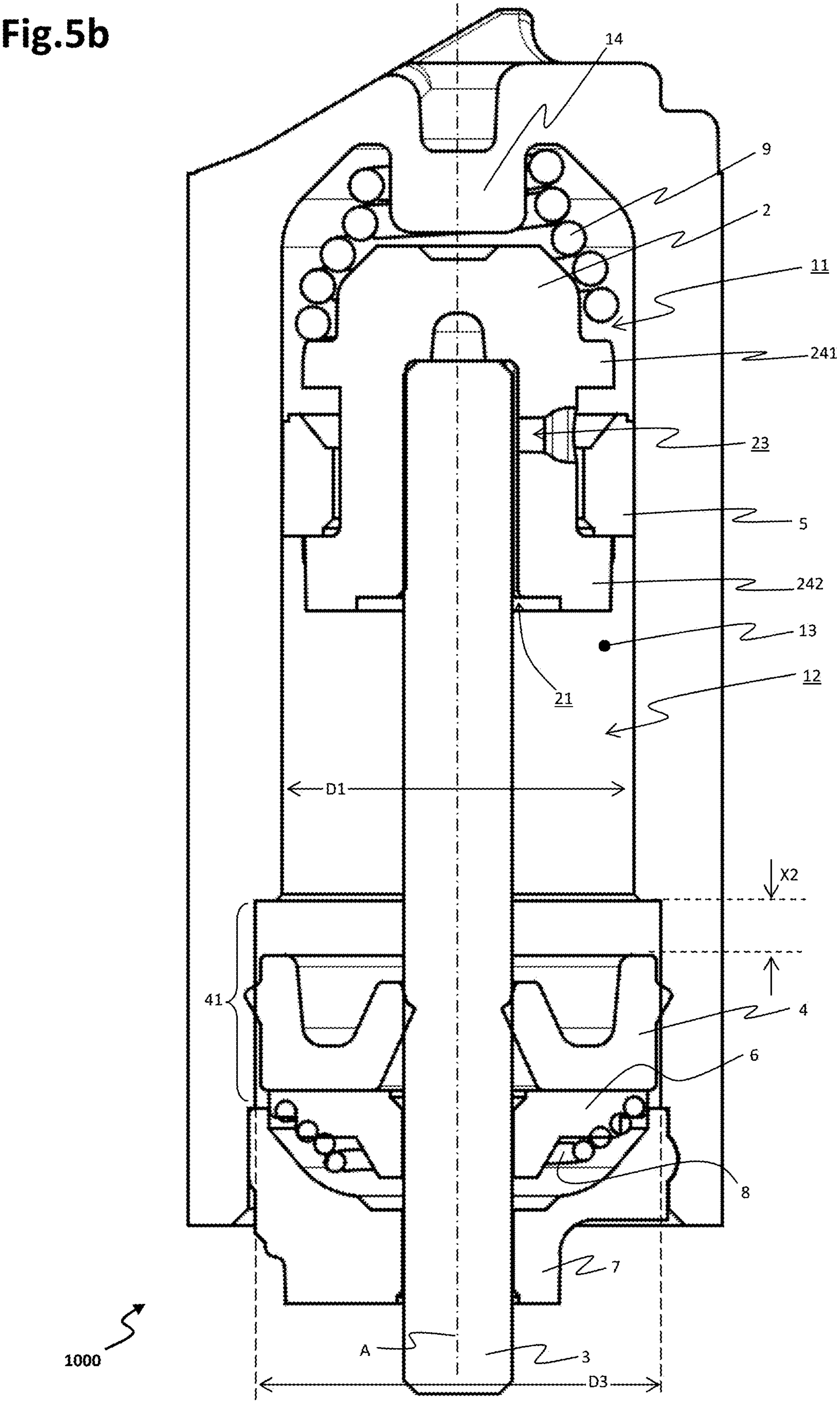
FIG. 5*b* shows an axial section view based on FIG. 5*a*.

FIG. 5*a* shows a partial cutaway view of the embodiment shown in FIG. 1 at an instance where the rod (5) is pushed into the housing (1) at a greater extent when compared to that shown in FIG. 4*a*. Here, the piston (2) is approached to the first end (14), the hydraulic fluid in the first chamber (11) is compressed, and exertion of a hydraulic force onto the collar (5) in an axial direction towards the second chamber (12) continues. The collar (5) is radially expanded, circumferentially sealing the space between the second shoulder (242) and inner surface (13) of the housing (1). The second elastic means (9) is fully compressed. The hydraulic pressure in the second chamber (12) is increased, thereby causing compression of the first elastic means (8). FIG. 5*b* shows an axial section view based on FIG. 5*a*, for a clearer visualisation of the components thereof at such instance.

When the rod (3) is released (for instance, upon ceasing the above-mentioned closing action), the respective piston (2) is forced to move to its default position, (i.e., away from the first end (14)) by the second elastic means (9), the following phenomena take place:

The volume of the second chamber (12) decreases and the pressure of hydraulic fluid from the second chamber (12) forces the collar (5) to radially expand such that outer surface (51) of the collar (5) circumferentially contact the inner surface (13) of the housing (1), thereby causing friction along with hermetical sealing therebetween.

Due to said friction, the collar (5) relatively moves relative to the piston (2) towards the first shoulder (241). Thus, any sealing contact between the collar (5) and the second shoulder (242) is ceased.

To equalize the hydraulic pressures at the first chamber (11) and second chamber (12), the hydraulic fluid flows from the second chamber (12) towards the first chamber (11) around the piston (2): through a relatively high flow cross-section between the first shoulder (241) and corresponding surfaces of the collar (5). Thus, fluid flow from the second chamber (12) towards the first chamber (11) is available with a relatively low extent of pressure drop, and a relatively rapid transfer of hydraulic fluid from the second chamber (12) into the first chamber (11) is enabled. This results in a faster movement of the piston when returning to its resting position (i.e., default position), when compared to that at damping. To this end, for instance, the first shoulder (241) can be considered to comprise a plurality of radial indentations to provide local diameter (D2) value(s) smaller than a corresponding local inner diameter of the collar (5), for provision of a flow cross-section greater than that at the channel (21), thereby enabling a relatively higher flow rate to the hydraulic fluid when the piston (2) moves away from the first end (14) at returning to the resting position thereof.

Considering the following facts that are inherent to the damper (1000):

the collar (5) comprises a circumferential outer surface (51) facing the inner surface (13) of the housing (1), said outer surface (51) has a cylinder side surface geometry with a height (L) (that is, the outer surface (51) has an axial cross section that is substantially parallel to the axis (A) throughout the height (L)), at zones that correspond to the trajectory of the piston (2) at its reciprocations along the axis (A), the inner surface (13) of the housing (1) has an inner diameter (D1) radial to said axis (A);

in a possible embodiment of the damper (1000), the L/D ratio between said height (L) and said inner diameter (D1) is preferably 0.3 or higher, more preferably 0.4 or higher.

Such high L/D values are considered to bear the following technical advantages:

i. Deviations between the axis (A) and a central axis of the collar are avoided. In other words, it is ensured that the longitudinal piston axis (A) and the central axis of the collar substantially overlap at any phase of the piston movements. As a result, the stability of the damper (1000) is enhanced.

ii. The pressure forces exerted by the inner surface (13) of the housing (1) onto the circumferential outer surface (51) of the collar (5) is evenly distributed to a relatively high contact area. Hence, a friction at an extent sufficient for dampening is available without necessitating a high extent of pressure onto the respective outer surface (51) of the collar (5) in contact with the inner surface (13) of the housing (1). So, occurrence of erosion on said outer surface (51) of the collar (5) is minimized or eliminated. As a result, the service life of the collar (5) and of the damper (1000) is increased.

Figure 6:
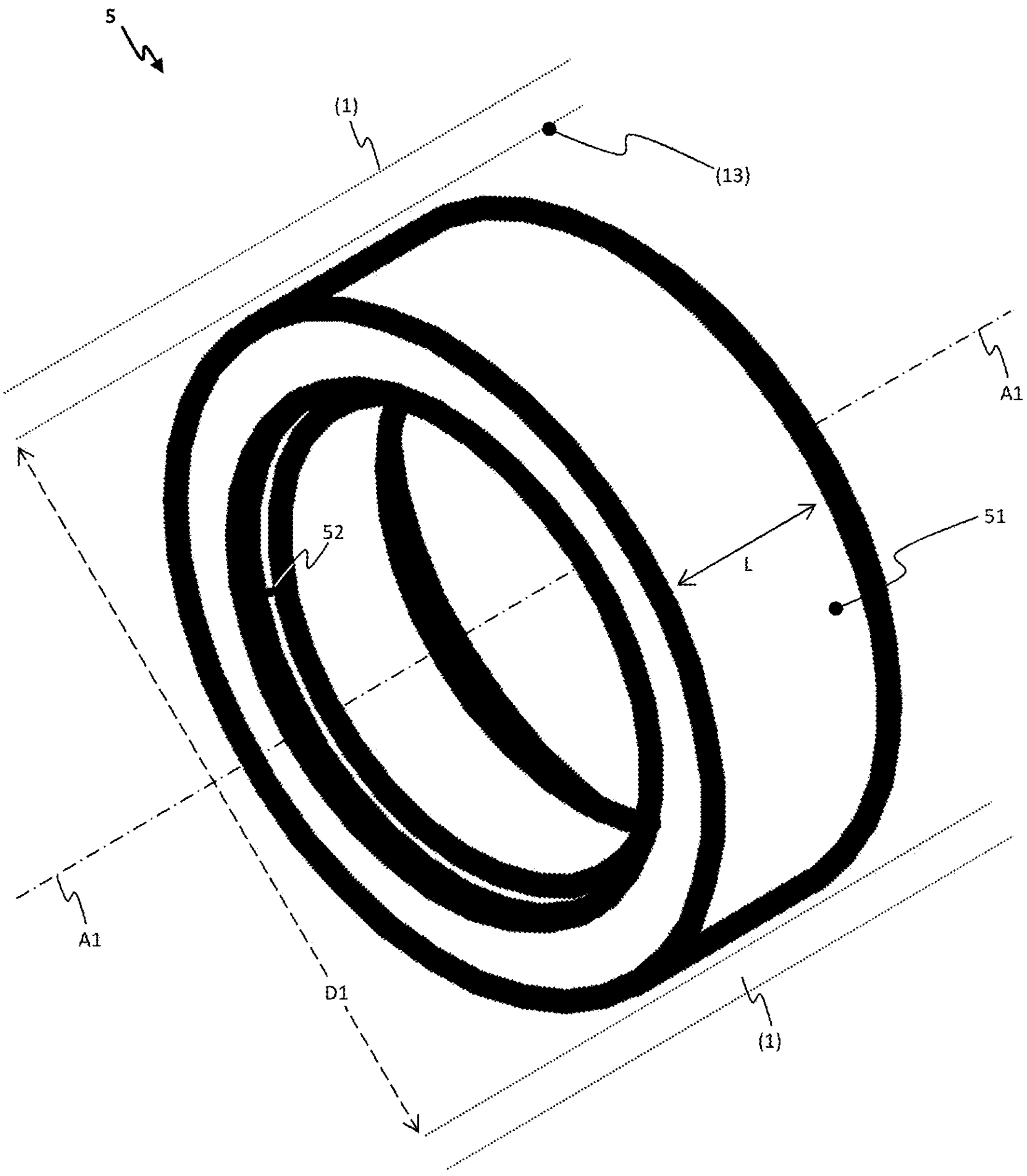
FIG. 6 is a perspective view of an exemplary collar for being employed in a damper according to the present invention.

FIG. 6 is a perspective view of an exemplary collar (5) for being employed in a damper (1000) according to the present invention. Here, dimensional considerations such as axial height of the collar (5) outer surface (51), and inner surface (13) diameter (D1) of the housing (1) around the piston (2), are emphasized.

When in use, the damper (1000) may be positioned into a cup or hinge arm of a respective hinge in a furniture piece. Accordingly, the present invention further proposes a furniture hinge that is provided with any of the aforementioned embodiments of the damper (1000). The present invention further proposes a drawer provided with any of the aforementioned embodiments of the damper (1000).

EXAMPLE

Over an exemplary, preferred embodiment according to the present invention, functioning of the damper (100) can be further explained as follows:

The damper (1000) comprises a housing (1), a piston rod (3) and a piston (2) connected to the piston rod (3) moveable in the housing (1) along the axis (A). When a respective furniture door undergoes a closing action, the piston rod (3) is pushed into the damper housing (1), volume of the first chamber (11) decreases, the collar (5) radially expands due to increased hydraulic pressure in the first chamber (11), contacts the inner surface (13) of the housing (1), circumferentially abuts to the second shoulder (242) and thus blocks fluid flow around the piston (2). Hydraulic fluid flow from the first chamber (11) to the second chamber (12) takes place through the channel (21), at a high extent of pressure drop and at a restricted extent of flow rate, thereby achieving a hydraulic damping (at closing of a respective furniture door or drawer of a respective furniture piece).

The damper (1000) includes a second elastic means (9) (return spring) arranged to bias the piston (2) away from the first end (14) towards the resting position of the piston (2).

The damper (1000) further includes a lid (7) distal to the first end (14), a seal (4) between the piston and the lid (7), a first elastic means (8) (seal positioning spring) arranged for biasing the seal (4) away from the lid (7), a supporting means (6) (bearing) disposed in between the lid (7) and seal (4) to conduct mechanical force therebetween. The seal (4) is preferably made from an elastic material to radially push against corresponding inner surface (13) of the housing (1), and the supporting means (6) protects the seal (4) from mechanical damages due to any unevenly distributed pressure forces exerted by the first elastic means (8).

REFERENCE SIGNS

1 housing
11 first chamber
12 second chamber
13 inner surface
14 first end
2 piston
21 channel
23 hole
24 groove
241 first shoulder
2411 indentation
242 second shoulder
3 rod
4 seal
41 seal zone
5 collar
51 outer surface
52 side surface
6 supporting means
7 lid
8 first elastic means
9 second elastic means
1000 damper
A axis
A1 central axis
D1 inner diameter (of the housing, at the first chamber and second chamber)
D2 local diameter (of the first shoulder, at indentations)
D3 extended diameter (of the housing, at the seal zone)
L height
X1 first distance
X2 second distance

The invention claimed is:

1. A hydraulic damper (1000) for use in furniture doors or drawers, the damper (1000) comprising a housing (1) that has a closed first end (14) and a second end that is provided with a lid (7); the damper (1000) further comprises a piston (2) that is movable in the housing (1) along a longitudinal piston axis (A); a piston rod (3) connected to the piston (2); the housing (1) is divided by the piston (2) to define a first chamber (11) and a second chamber (12) that are respectively at a first end side and a second end side of the piston (1); wherein the piston (2) comprises a circumferential groove (24) that is defined between a circumferential first shoulder (241) and a circumferential second shoulder (242) provided at a second end side with regard to the first shoulder (241);

the piston rod (3) activating a damping of the piston (2);

the groove (24) is provided with an annular collar (5) that is axially movable between the first shoulder (241) and second shoulder (242);

the collar (5) is formed from an elastic material, and is arranged to reversibly contact to an inner surface (13) of the housing (1) when radially expanded when subjected to hydraulic pressure forces that are parallel to the axis (A);

the first shoulder (241) is arranged to allow hydraulic fluid to flow on the collar (5) when the collar (5) is brought into contact with the first shoulder (241);

the second shoulder (242) is arranged to block hydraulic fluid from flowing on the collar (5) when the collar (5) is brought into contact with the second shoulder (242);

the piston (2) is provided with a channel (21) that is arranged to provide fluid flow communication between said first chamber (11) and second chamber (12);

the collar (5) comprises a circumferential outer surface (51) facing the inner surface (13) of the housing (1), the outer surface (51) having a cylinder side surface geometry with a height (L);

at zones that correspond to a trajectory of the piston (2) at its reciprocations along the axis (A), the inner surface (13) of the housing (1) has an inner diameter (D1) radial to said axis (A); and an L/D ratio between said height (L) and said inner diameter (D1) is 0.3 or higher.

2. Damper according to claim 1, wherein the channel (21) is arranged to provide a fluid flow communication between the second chamber (12) and the groove (24).

3. Damper according to claim 2, wherein the groove (24) is provided with a hole (23) connected to the channel (21).

4. Damper according to claim 3, wherein the collar (5) is shaped and sized to, delimit the fluid communication through the hole (23) when in contact with the first shoulder (241) and relatively increase the fluid flow communication through the hole (23) when in contact with the second shoulder (242).

5. Damper according to claim 1, wherein the first shoulder (241) comprises a plurality of radial indentations to provide a local diameter (D2) value smaller than a corresponding local inner diameter of the collar (5).

6. Damper according to claim 1, provided with a seal (4) circumferentially disposed around the piston rod (3), arranged for preventing hydraulic liquid leakage from the second chamber (12) towards the lid (7).

7. Damper according to claim 6, provided with a first elastic means (8) in-between the lid (7) and the seal (4), for biasing the seal (4) away from the lid (7).

8. Damper according to claim 6, wherein the housing (1) is provided with an extended diameter (D3) around a locus of the seal (4) to have a value that is higher than an inner diameter (D1) of the housing (1) at the first chamber (11) and second chamber (12).

9. Damper according to claim 7, provided with a supporting means (6) in-between the seal (4) and first elastic means (8), arranged for bearing the first elastic means (8) and for uniformly distributing the mechanical forces from the first elastic means (8) onto the seal (4).

10. Damper according to claim 1, provided with a second elastic means (9) disposed between the first end (14) and the piston (2), arranged for biasing the piston (2) away from the first end (14).

11. Damper according to claim 1, wherein said L/D ratio is 0.4 or higher.

12. A furniture hinge provided with a damper according to claim 1.

13. A furniture drawer provided with a damper according to claim 1.

* * * * *